(12) United States Patent
Brewer (10) Patent No.: US 11,633,890 B2
(45) Date of Patent: Apr. 25, 2023

(54) METHOD FOR FORMING HERMETICALLY SEALED TUBING CAPS

(71) Applicant: Sinclair & Rush, Inc., Arnold, MO (US)

(72) Inventor: Phillip M. Brewer, Fenton, MO (US)

(73) Assignee: Sinclair & Rush, Inc., Arnold, MO (US)

( * ) Notice: Subject to any disclaimer, the term of this patent is extended or adjusted under 35 U.S.C. 154(b) by 0 days.

(21) Appl. No.: 17/274,919

(22) PCT Filed: Sep. 10, 2019

(86) PCT No.: PCT/US2019/050306
§ 371 (c)(1),
(2) Date: Mar. 10, 2021

(87) PCT Pub. No.: WO2020/055794
PCT Pub. Date: Mar. 19, 2020

(65) Prior Publication Data
US 2022/0024087 A1    Jan. 27, 2022

Related U.S. Application Data

(60) Provisional application No. 62/729,072, filed on Sep. 10, 2018.

(51) Int. Cl.
*B29C 45/14* (2006.01)
*B29K 67/00* (2006.01)
*B29L 31/00* (2006.01)

(52) U.S. Cl.
CPC .. *B29C 45/14008* (2013.01); *B29C 45/14065* (2013.01); *B29C 45/14598* (2013.01); *B29K 2067/003* (2013.01); *B29K 2995/0026* (2013.01); *B29L 2031/712* (2013.01)

(58) Field of Classification Search
CPC ........ B29C 45/14008; B29C 45/14065; B29C 45/14598; B29C 45/14426
See application file for complete search history.

(56) References Cited

U.S. PATENT DOCUMENTS

| 1,620,728 | A | | 3/1927 | Percy |
| 2,777,164 | A | | 1/1957 | Strahm |
| 3,207,833 | A | * | 9/1965 | Errico ..................... B29C 45/40 |
| | | | | 425/437 |

(Continued)

FOREIGN PATENT DOCUMENTS

| CN | 105599217 B | 7/2019 |
| CN | 107405809 B | 12/2019 |

(Continued)

OTHER PUBLICATIONS

PCT International Search Report and Written Opinion issued in PCT/US2019/050306, dated Nov. 15, 2019; 8 pages.

(Continued)

*Primary Examiner* — Edmund H Lee
(74) *Attorney, Agent, or Firm* — Alliance IP, LLC (57) ABSTRACT

A method of forming a container from a tubular member comprises the steps of positioning a tubular member on a support structure, moving a platen of an injection molding die to engage the tubular member to form a cavity and injecting material into the cavity.

20 Claims, 9 Drawing Sheets

(56) References Cited

U.S. PATENT DOCUMENTS

| | | | |
|---|---|---|---|
| 3,417,899 A * | 12/1968 | Brown | B29C 45/14598 |
| | | | 220/613 |
| 3,940,103 A | 2/1976 | Hilaire | |
| 4,834,638 A | 5/1989 | Miyahara et al. | |
| 5,683,647 A | 11/1997 | Kawasaki et al. | |
| 2001/0026872 A1 * | 10/2001 | Tanaka | B29C 45/14598 |
| | | | 428/411.1 |

FOREIGN PATENT DOCUMENTS

| | | | |
|---|---|---|---|
| FR | 1216466 A | 4/1960 | |
| GB | 1275051 A | 5/1972 | |

OTHER PUBLICATIONS

Chinese Office Action received in Application No. 201980059007.1, dated Oct. 25, 2022, 9 pages.
EPO; Extended European Search Report issued in EP Patent Application No. 19859126.5, dated May 16, 2022; 7 pages.
Chinese Office Action received in Application No. 201980059007.1, dated Mar. 21, 2022, with English translation, 16 pages.

* cited by examiner

METHOD FOR FORMING HERMETICALLY SEALED TUBING CAPS

CROSS-REFERENCE TO RELATED APPLICATIONS

This application is a national stage application under 35 U.S.C. § 371 of PCT International Application Serial No. PCT/US2019/050306, filed on Sep. 10, 2019, and entitled "METHOD AND APPARATUS FOR FORMING HERMETICALLY SEALED TUBING CAPS," which application claims the benefit of priority to U.S. Provisional Patent Application Ser. No. 62/729,072, filed on Sep. 10, 2018, and entitled "METHOD AND APPARATUS FOR FORMING HERMETICALLY SEALED TUBING CAPS." The disclosures of the prior applications are considered part of and are hereby incorporated by reference in their entirety in the disclosure of this application.

TECHNICAL FIELD

The present disclosure is related to a process for forming a container having walls by molding an integral terminator onto the open end of a tubular member.

BACKGROUND

While it is well known to use containers having annular cylindrical side walls with a terminated bottom, such a pill bottle, for example, methods for producing such containers are widely diverse. In some cases, the cylindrical container may be molded as a unit using blowmolding or injection molding techniques. Such approaches require large, dedicated, tooling that is sized for the particular volume of container required. Such approaches require significant investment in identifying gating locations and close control of temperature across the mold to properly form the components. Such approaches are costly and cost prohibitive for small quantities.

An alternative approach is to utilize cylindrical stock and glue terminators, or caps, to an end of the cylindrical member. This approach requires less capital investment than the molding approach discussed above, but is more labor intensive and requires close control of the tolerances of the cylindrical stock and the terminators to maintain a consistent size. In some cases, the completed units are trimmed to length after the addition of the terminators.

A key aspect of modern lean manufacturing is a need to maintain minimal inventories and provide flexible manufacturing processes that can deliver to variable customer demand. As different sizes of containers are ordered by customers, there is a need to provide those containers with low cost, with quick turnaround, and with an ability to tailor the size to the customer needs.

SUMMARY

The present disclosure includes one or more of the features recited in the appended claims and/or the following features which, alone or in any combination, may comprise patentable subject matter.

According to a first aspect of the present disclosure, a method of forming a container from a tubular member comprises the steps of positioning a tubular member on a support structure, moving a platen of an injection molding die to engage the tubular member to form a cavity and injecting material into the cavity. The step of positioning the tubular member on the positioner includes locating the positioner on a support such that the positioner of the support locates the tubular member relative to a post of the support. The post is configured to define a first side of a cavity for receiving a material injected into the cavity. The step of moving a platen of an injection molding die to engage with the tubular member includes the platen moving a portion of structure configured to define a second side of the cavity for receiving the material injected into the cavity and defining side walls of the cavity that correspond to the outer surface of the tubular member. Injecting a material into the cavity includes the material forming a plug that engages an inner surface of the tubular member to form a hermetic seal. The material further forms a cap for the tubular member which fills any space between a terminus of the tubular member and the cavity to form an extension of the walls of the tubular member such that the container has a length defined by a distance between the positioner and a terminal end of the cavity.

In some embodiments, the material is injected under pressure and in a plasticized state.

In some embodiments, the material is permitted to cool in the cavity to form the final shape of the container.

In some embodiments, the method further comprises adjusting the location of the positioner along the length of the post to adjust for a variance in the length of tubular member.

In some embodiments, the support is positioned on a carrier that is movable relative to the platen and the platen engages with a portion of the carrier as the platen is moved to engage with the tubular member, the engagement of the platen with the portion of the carrier causing the platen to be located relative to the support and tubular member.

In some embodiments, a plurality of supports are positioned on the carrier, each support including a positioner and a post supporting a respective tubular member and movement of the platen causes a respective cavity to be formed for each tubular member.

In some embodiments, each of the respective tubular members is simultaneously formed into a container as material is injected into each respective cavity.

In some embodiments, the method further comprises adjusting the location of each respective positioner along the length of each respective post to adjust for a variance in the length of the respective tubular member.

According to a second aspect of the present disclosure, a method of forming a container having a fixed length from tubular blanks having variable lengths comprises locating a first end of a tubular blank relative to an injection molding die, inserting an open end of the tubular blank into the injection molding die, and injection molding a plug in the interior of the tubular blank to form a bottom of the container while simultaneously forming a cap on the tubular blank to form a wall that is coincident with the existing wall of the tubular blank to form the container with a pre-defined length that is independent of the length of the tubular blank.

In some embodiments, the locating of the first end of the tubular blank includes positioning the first end of the tubular blank against a positioner that supports the tubular blank relative to the injection molding die.

In some embodiments, the method further comprises adjusting the location of the positioner to account for a different length of a tubular blanks.

In some embodiments, the positioner is adjustable relative to a post and the post defines a boundary of at least a portion of the plug that is formed in the injection molding die.

In some embodiments, a portion of the injection molding die moves relative to the post.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
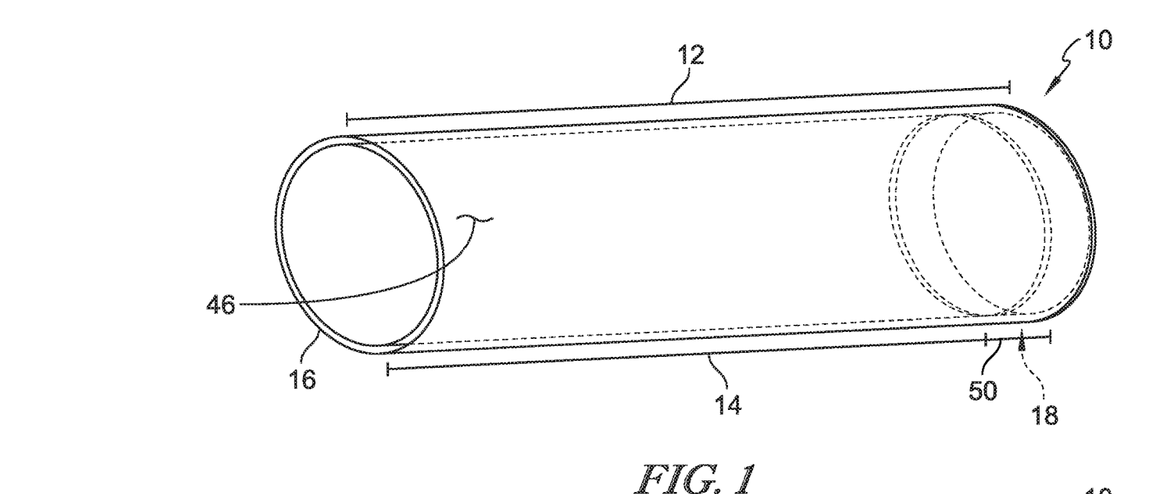
FIG. 1 is a perspective view of a cylindrical container formed according to the present disclosure.
Figure 2:
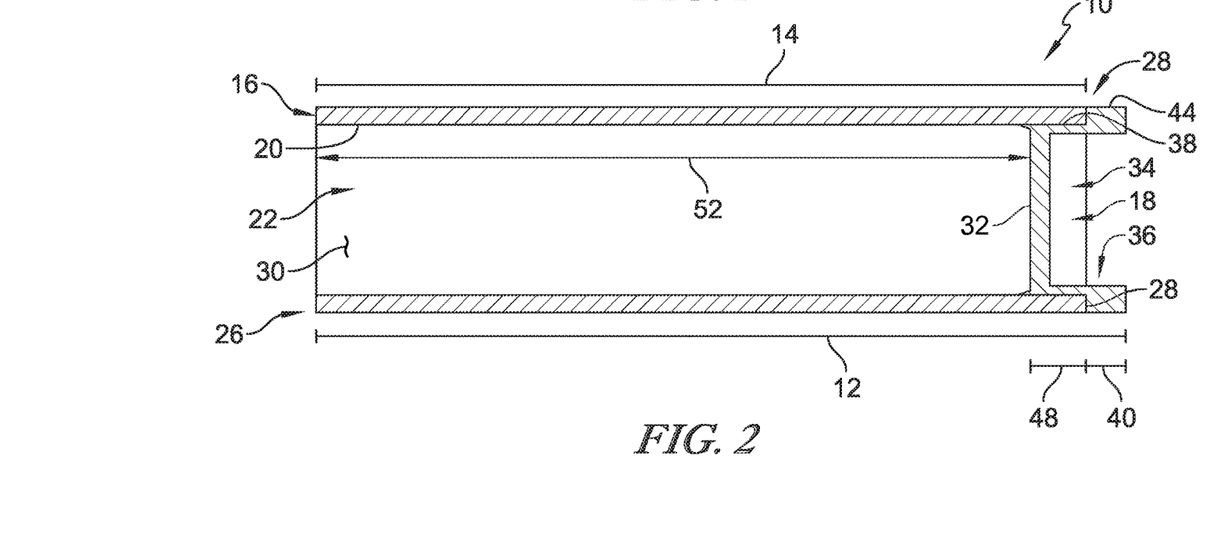
FIG. 2 is a cross-sectional view of the cylindrical container of FIG. 1.
Figure 3:
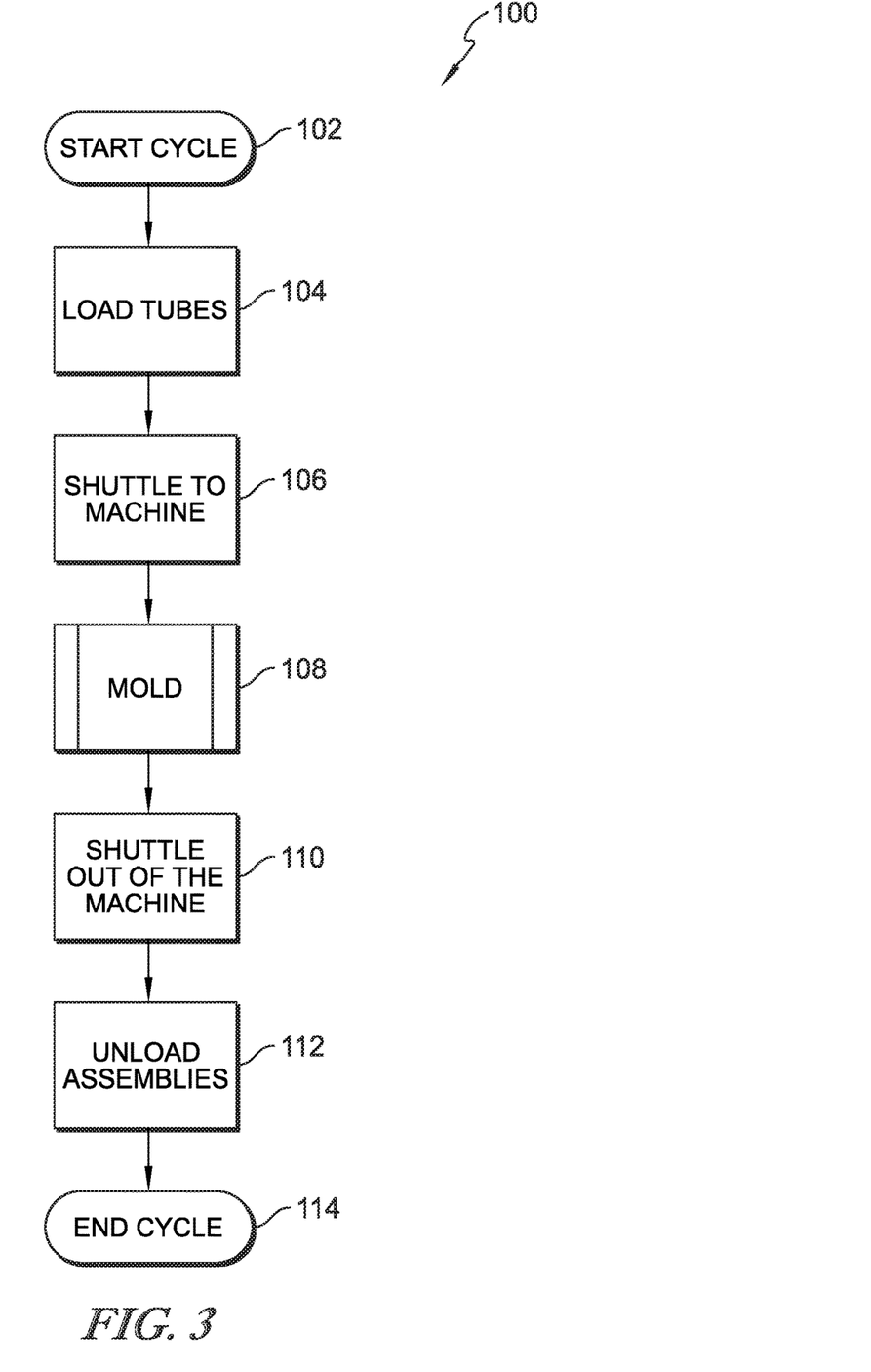
FIG. 3 is a flowchart of the method of forming the cylindrical container of FIG. 1.

The present disclosure relates to a process 100, as shown in FIG. 3, for producing a cylindrical container 10, as shown in FIG. 1, with closely held tolerances. A length 12 of the container 10 is not wholly dependent on the length 14 of a cylindrical member 16 shown in FIG. 2, but is controlled through the process 100 to allow for variations in the length 14 to be overcome and provide a consistent length 12 of the container 10. A terminator 18 is applied to the container 10 by injection molding such that the combination of the terminator 18 and cylindrical member 16 cooperate to define the length 12 that is consistent across variations in the length 14 of the cylindrical member 16. In addition, as will be discuss in further detail below, the process 100 utilizes an adjustment to allow for cylindrical members 16 that have different nominal lengths so that the same process may be used to produce cylindrical containers 10 having different lengths without the need for different molds. The illustrative container 10 is transparent. The transparency of the material is a functional aspect that allows user to see the contents and the quantity of material in the container 10. The aesthetic quality of the container 10 is an important aspect and is achieve by using a relatively thin-walled material including polyethylene terephthalate (PET) or derivatives of PET such as polyethylene terephthalate glycol (PETG), for example, that maintains good rigidity for the cylindrical member 16. Similarly, the terminator 18 is illustratively made from a PET, PETG, or polyvinyl chloride (PVC) that has transparency, as well. The presently disclosed method and apparatus are configured for processing of the container 10 to maintain the aesthetic aspects while reducing costs.

Referring to the cross-sectional view of the cylindrical container 10 in FIG. 2, the cylindrical member 16 comprises an annular wall 20 that defines an interior region 22 with a terminus 24 at a first end 26 of the cylindrical member 16. The terminator 18 is formed on a second end 28 of the cylindrical member 16 such that the interior region 22 is bounded by an internal surface 30 of the annular wall 20 and an internal surface 32 of the terminator 18. The terminator 18 is formed to include a plug portion 34 and a cap portion 36. It should be understood that the terminator 18 is a monolithic structure and the plug portion 34 and cap portion 36 are integrally formed as a single unit. However, the plug portion 34 is defined by an interface 38 that engages a portion of the internal surface 30 of the cylindrical member 16 forming a hermetic seal between the plug portion 34 and the cylindrical member 16. The plug portion 34 is further defined by the internal surface 32. The cap portion 36 has a length 40 that extends between the second end 28 and an outer surface 42 of the terminator 18. The cap portion 36 is defined by a cylindrical outer surface 44 which generally coincides with an outer cylindrical surface 46 of the cylindrical member 16. A length 48 of the plug portion 34 and the length 40 cooperate to define a length 50 of the terminator 18, but the lengths 48 and 40 "float" to allow for variations in the length of the cylindrical member 16 while maintaining a length 12 of the container 10.

This ability for the lengths 48 and 40 to vary while maintaining the overall length 12 of the container 10 provides end product containers 10 that have consistent external sizes while moving any variation to a length 52 of the interior region 22 between the internal surface 32 of the terminator 18 and the first end 26 of the cylindrical member 16. Practically speaking, moving the variations in length to the interior region 22 does not impact the utility of the container 10 because the interior region 22 is sized to have more than sufficient capacity to hold whatever quantity of material may be stored therein. However, having a consistent external dimension in the form of length 12 of the container 10 allows for ease of handling of the containers 10 before they are used for storage. As such, the ability to maintain the length 12 consistently is an advantage. Moreover, the ability to maintain the length 12 while allowing for variations in length 14 reduces the cost of producing the cylindrical members 16 as the cylindrical members 16 are cut to length without the need for tight tolerance control. This allows the cylindrical members 16 to be extruded and cut to length at high speed, thereby reducing costs.

Figure 5:
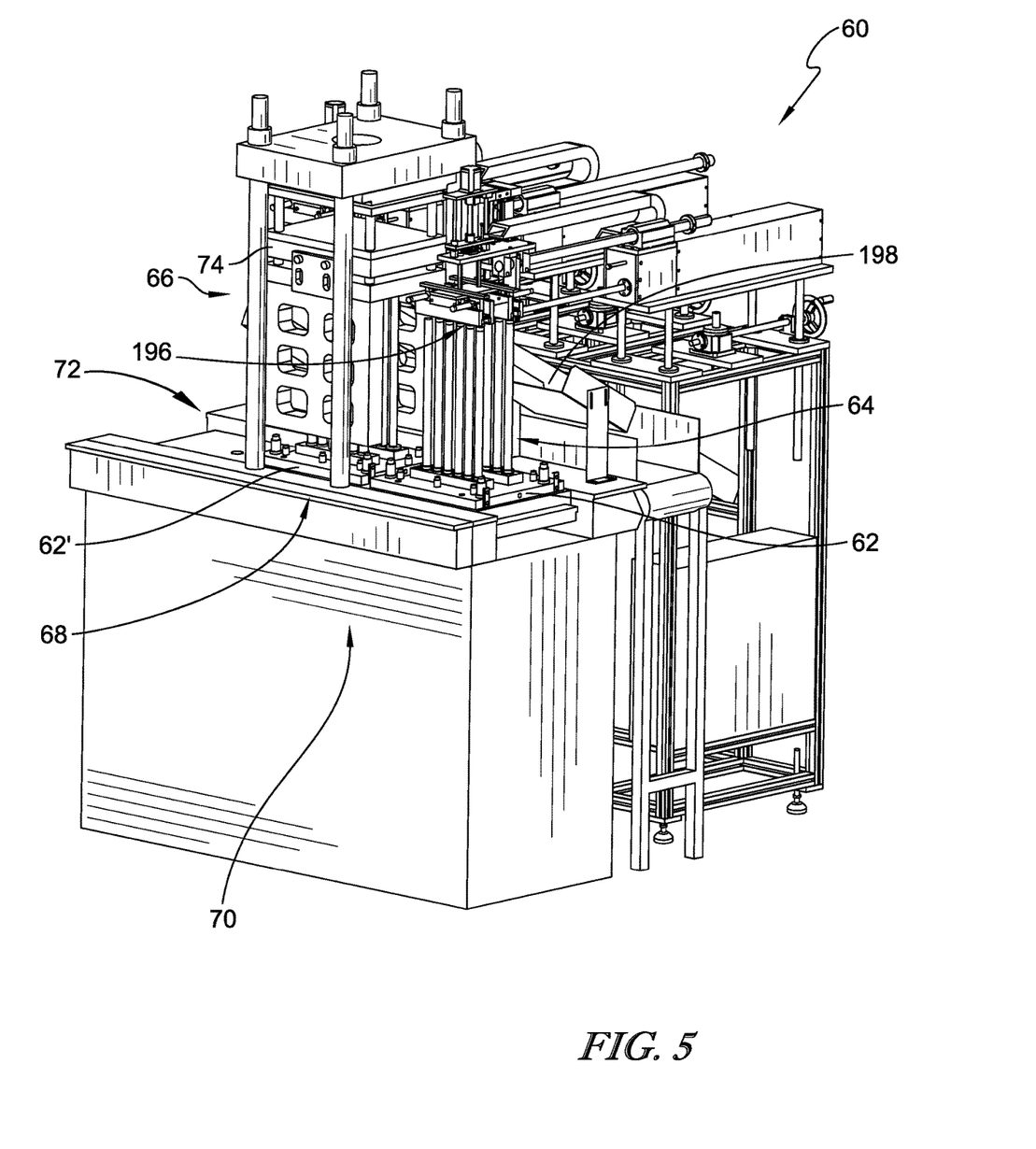
FIG. 5 is a perspective view of piece of equipment configured to perform the method disclosed in FIG. 3.
Figure 6:
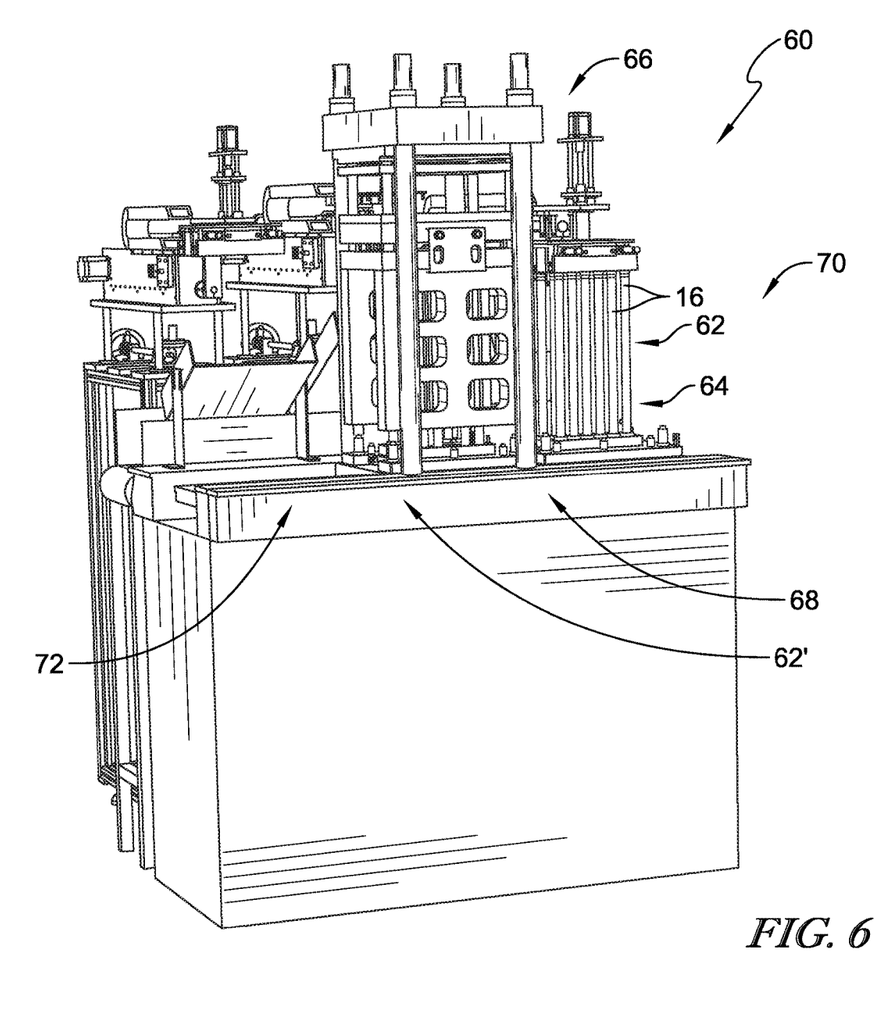
FIG. 6 is another perspective view of the piece of equipment of FIG. 5.

The overall process 100 is shown in FIG. 3 with reference to the apparatus 60 shown in FIGS. 5 and 6. A production cycle begins at a start step 102 where the cycle is initiated. At a process step 104, cylindrical members or tubes 16 are loaded onto a carrier 62, which includes a number of supports 64, as will be described in further detail below. The carrier 62 is positioned on a right-hand side 70 of a shuttle assembly 68. Once the tubes 16 are loaded, the apparatus 60 progresses to a process step 106 where the carrier 62 is shuttled into a vertically oriented injection molding machine 66. Notably, a separate, but similar, carrier 62' is shuttled out of the machine 66 to be positioned on a left-hand side 72 of the shuttle assembly 68. During subsequent cycles, the carriers 62, 62' are shuttled back and forth so that while one carrier 62 or 62' is being processed in the machine 66, the other is being unloaded and re-loaded on opposite sides 70, 72, respectively, of the shuttle assembly 68.

Figure 4:
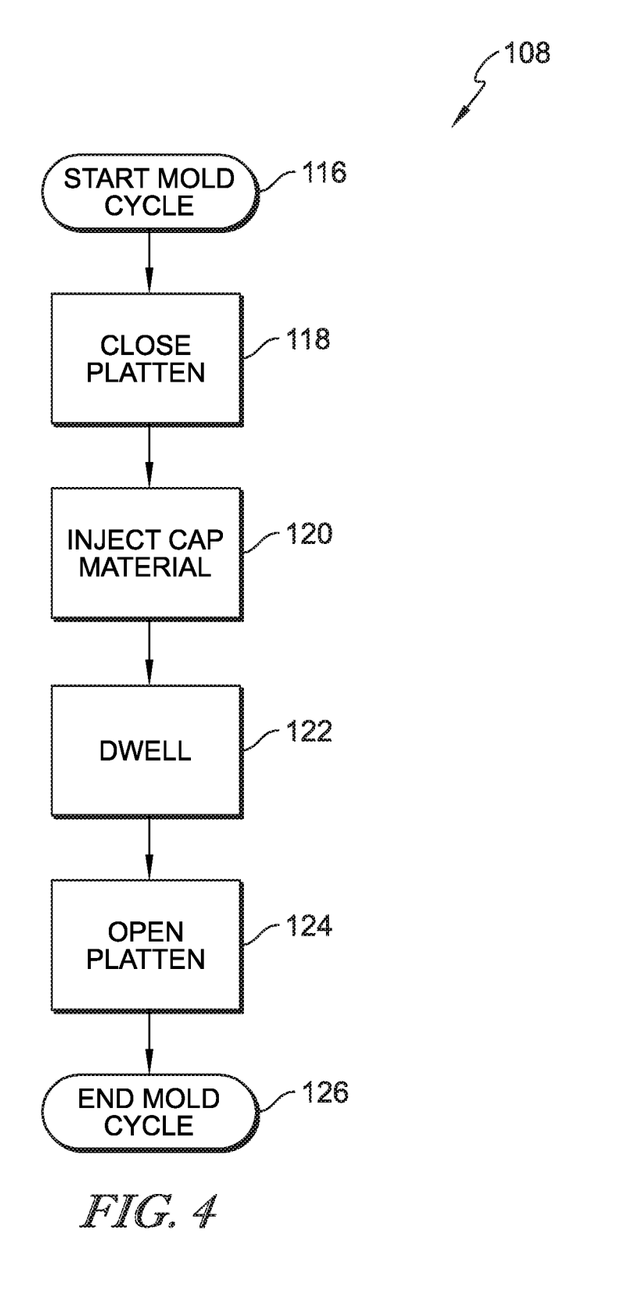
FIG. 4 is a flowchart of a sub-method of the method of the flowchart of FIG. 3.

Once the carrier 62 is positioned in the machine 66, a platen 74 is closed and the machine 66 injection molds the terminators 18 on the tubes 16 at a process step 108. The process 108 is described in further detail below, with reference to FIG. 4. Once the molding process 108 is complete, the carrier 62 is shuttled out of the machine 66, while the carrier 62' is shuttled into the machine 66 at a process step 110. The completed containers 10 are then unloaded at process step 112 and the cycle is ended at step 114. Another cycle can be initiated and the process 100 is re-run. It should be understood that the carrier 62' may be processed while carrier 62 is being unloaded and re-loaded, thereby utilizing the machine 66 in alternate cycles, or only one of the carriers 62 or 62' may be processed without the presence or processing of the other of the carriers 62, 62'.

Figure 7:
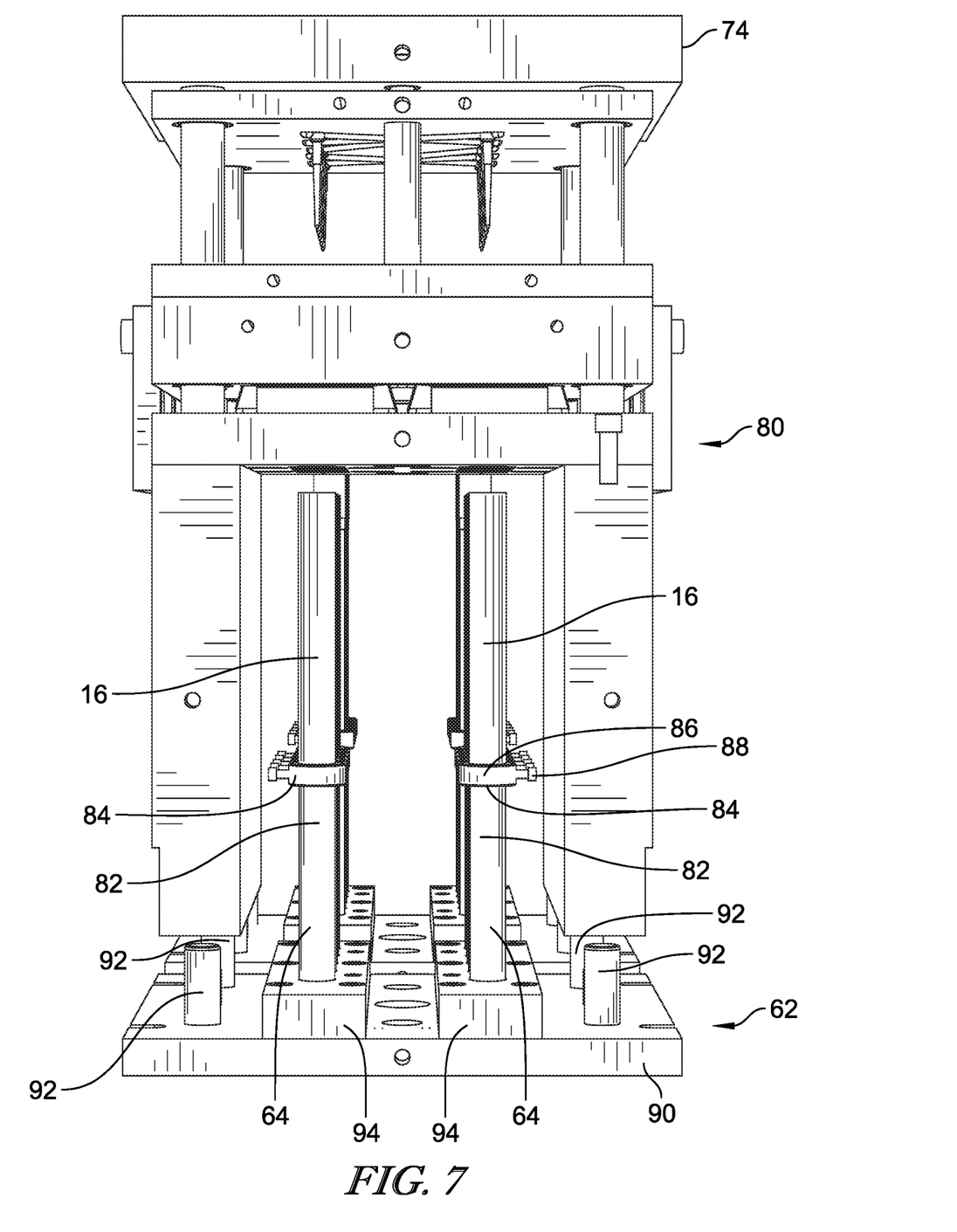
FIG. 7 is a perspective view of an injection molding die used in the piece of equipment of FIGS. 5 and 6, the molding die in an open position.
Figure 8:
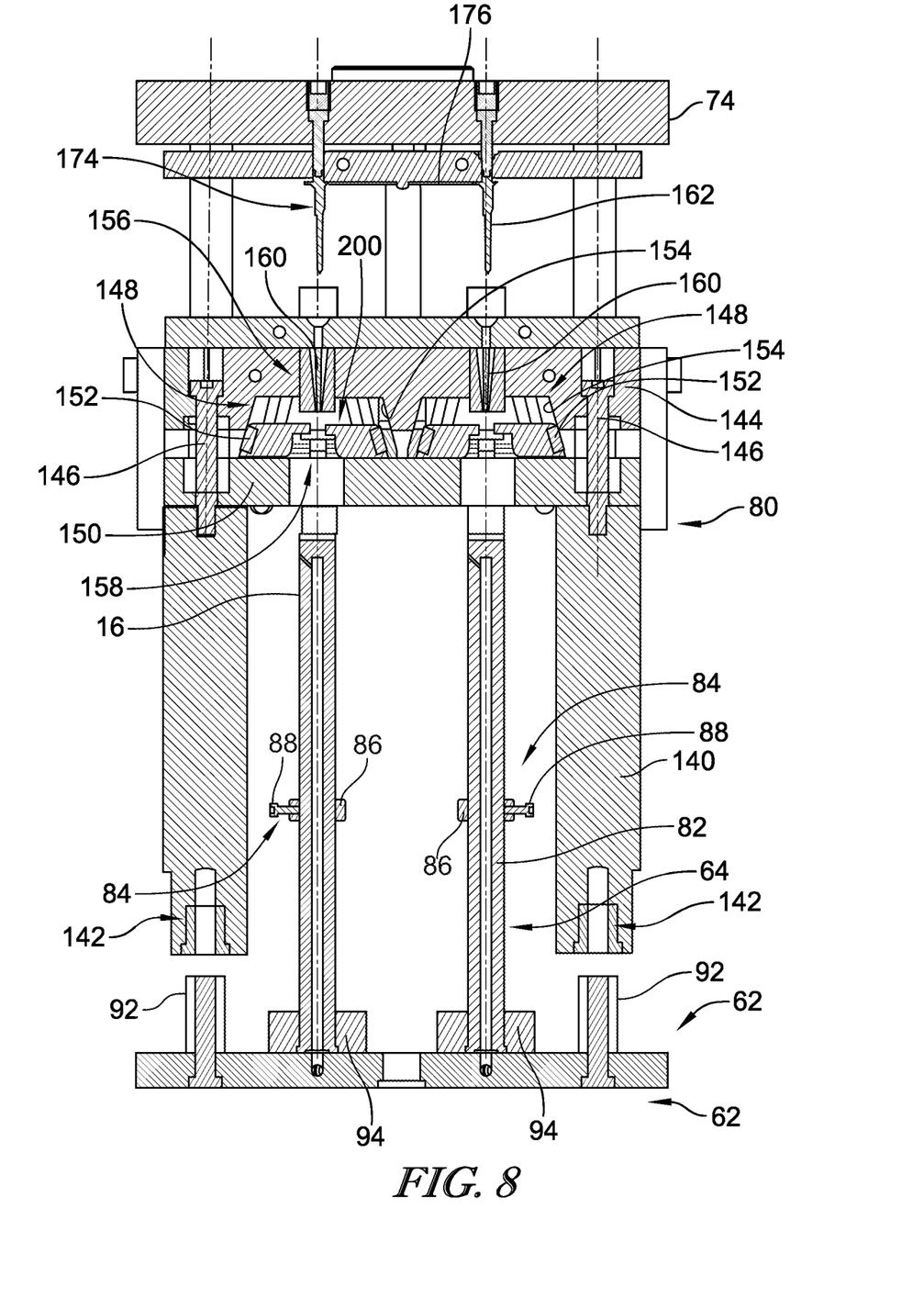
FIG. 8 is a cross-sectional view of the molding die of FIG. 7.

The mold process 108 is commenced at step 116 when the carrier 62 (or 62') is positioned in the machine 66. A molding die 80 is in an open position as shown in FIG. 7 when the mold process 108 begins at step 116. The die 80 is moved to a closed position as shown in FIG. 8 at a process step 118. Once the platen is closed at step 118, the plasticized terminator material is injected under pressure into the die at a process step 120. During a process step 122, the machine 66 dwells for a period of time to allow the injected material to freeze into the final shape of the terminator 18. The die 80 is then opened at a step 124 and the mold process 108 ends at step 126.

Referring now to FIG. 7, the carrier 62 includes the supports 64 which are each configured to support a cylindrical member 16. The supports 64 include a post 82 and a positioner 84 secured to the post 82 to locate the cylindrical member 16 along the post 82. The positioners 84 include a ring 86 and a set screw 88 which is used to secure the positioner 84 to secure the positioner on the post 82. The set screws 88 allow the positioners to be positioned along the post 82 to vary the position of the positioner 84 to account for cylindrical members 16 of different lengths. Thus, to process a container 10 with a different length 12, the positioners 84 are positioned appropriately for the original length 14 of the cylindrical member 16. While the present disclosure shows the positioners 84 all aligned to the same length on the posts 82, it should be understood that various lengths of cylindrical members 16 could be processed in a single cycle with the positioners 84 being adjusted for the various lengths. In the presently disclosed embodiment, the carrier 62 is configured to support two rows of four cylindrical members 16 so that eight containers 10 are formed in a single cycle. It should be understood that the number of supports 64 may be varied with the number of cavities in the molding die 80 being varied to correspond to the number of supports 64 so that other quantities of containers 10 may be formed in a single cycle, as required by customer demand and efficiency.

The carrier 62 includes a plate 90 that includes four locator pins 92 that are engaged by the molding die 80 to locate the molding die 80 relative to the carrier 62. The posts 82 are supported on blocks 94 mounted to the plate 90. It should be noted that the carrier 62 is effectively stationary during the molding process 108 with the posts 82 serving as one side of a cavity 158 for the terminator 18. The remainder of the operation of the molding die 80 being shown in the cross-sectional views of FIGS. 8-10.

Referring to FIG. 8, when the die 80 is open or retracted the molding die 80 includes four assemblies that are movable during the closing of the die 80 during engagement with the carrier 62. The die 80 includes a base 140 that is configured to engage the locator pins 92 of the carrier 62 as the die 80 is moved relative to the carrier 62 with corresponding cavities 142 engaging the pins 92 and aligning the die 80 with the carrier 62. The base 140 is engaged with a die plate 144 with the die plate 144 being engaged with guide pins 146 which align the die plate 144 as the die plate 144 moves relative to the base 140. In addition, the die plate 144 engages seal assemblies 148 that that are fixed to a frame 150 of the base 140 so that as the die plate 144 moves into engagement with the frame 150, seals 152 of the seal assemblies 148 engage a tapered surface 154 formed in each of the cavities to cause the interface between the die plate 144 and the base 140 to be pressure sealed. The die plate 144 is formed to include mold bodies 156 which extend into a space 200 in the frame 150 to form the second portion of the cavity 158 for forming the terminator 18. Each mold body 156 has a hollow passageway 160 through which the injected material 162 is pushed by the machine 66. The passageway 160 terminates at a tip 164 as is best seen in FIG. 10.

Figure 9:
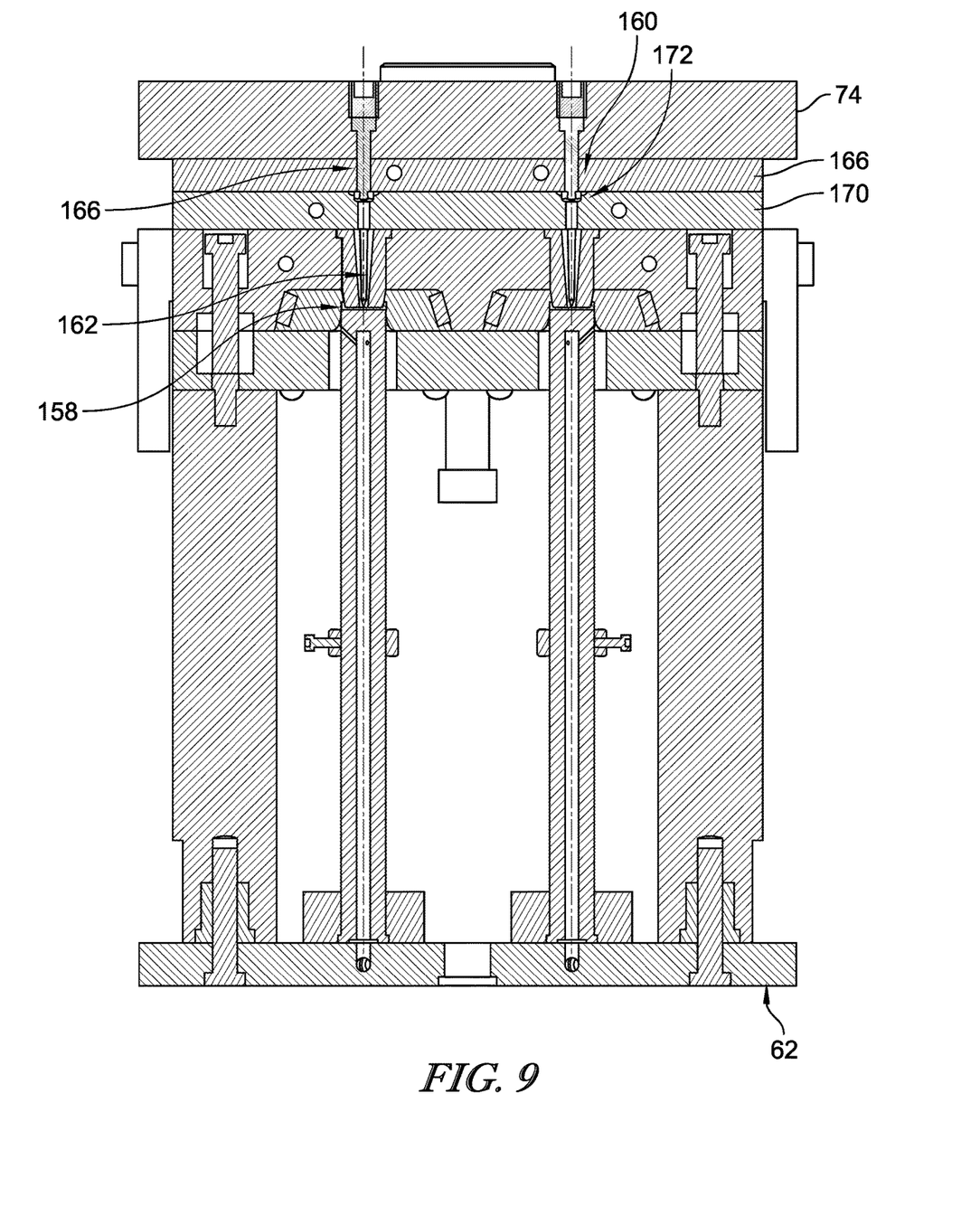
FIG. 9 is a cross-sectional view of the molding die of FIG. 7 similar to FIG. 8, FIG. 9 showing the molding die in a closed position.

Referring to FIG. 9, when the molding die 80 is closed, a nozzle 166 extends through a pressure plate 168 and an ejector plate 170 to be aligned with a countersunk opening 172 which is the end of the passageway 160 opposite the tip 164. Material 162 is pushed into the passageway 160 by the machine 66 and fills the cavity 158 with material 162. In addition, the passageway 160 and countersunk opening 172 are also filled with material 162 such that the material 162 forms the terminator 18 as well as overflow material 178 in the form of sprues 174 interconnected by runners 176, as suggested in FIG. 8. The ejector plate 170 separates the overflow material 178 from the nozzle 166, as is known in the art.

Figure 10:
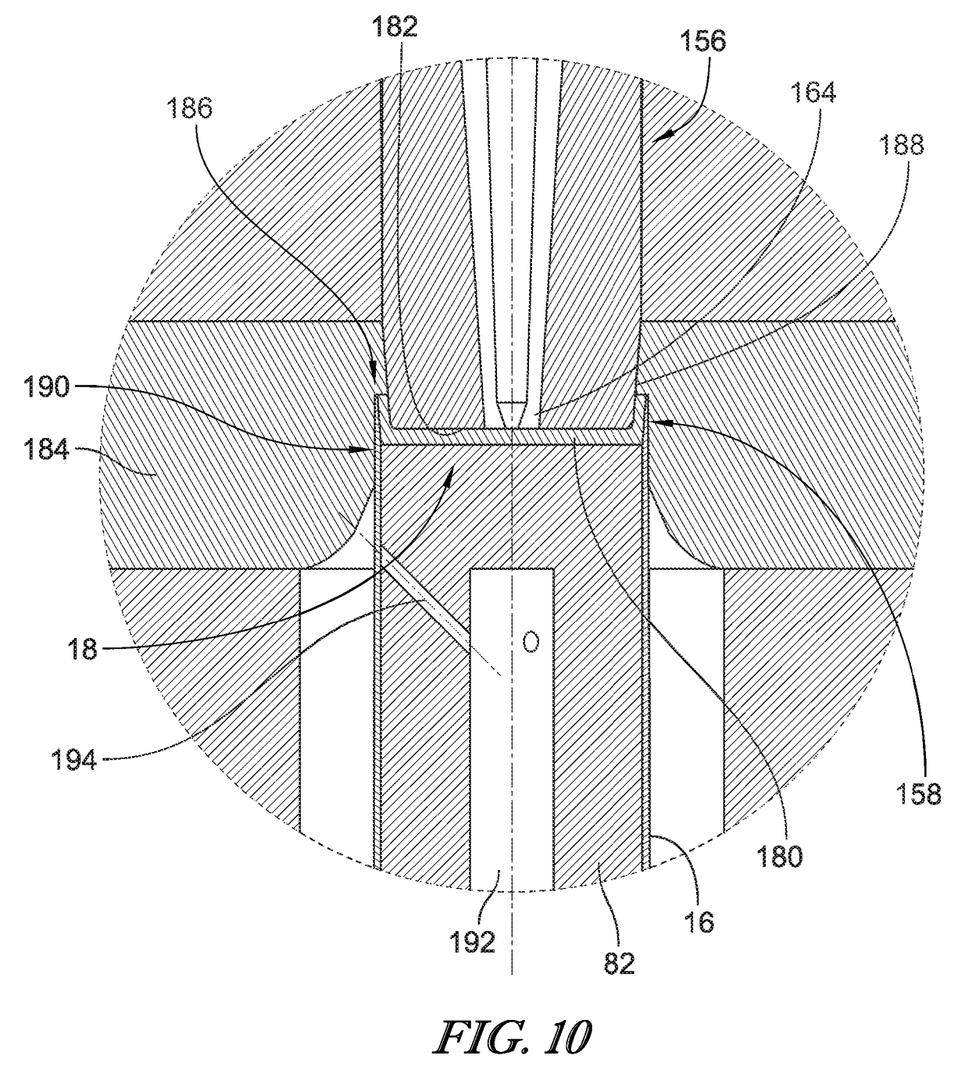
FIG. 10 is an enlarged cross-sectional view of a portion of the molding die shown in FIG. 9.

Referring now to FIG. 10, the cavity 158 is formed between an upper surface 180 of the post 82 and a lower surface 182 of the mold body 156 and is generally bounded by the internal surface 30 of the cylindrical member 16. The cylindrical member 16 is positioned to contact an annular wall 190 of a body 184 of the seal assembly 148. The body 184 is formed to include a ridge 186 that provides a boundary for the cavity 158. In some cases, the cylindrical member 16 may be somewhat shorter and insufficient to engage the ridge 186. In those instances, the material 162 flows into the gap between the ridge 186, the cylindrical member 16, an outer annular surface 188 of the mold body 156 and the annular wall 190 to cause the material 162 to form an extension of the surface 46 by forming the surface 44 of the container 10 as shown in FIG. 2. Thus, variations in the length 14 of the cylindrical member 16 are accounted for in the cavity 158 so that that length 12 of the container 10 is held with a close tolerance.

Once the process 108 is complete, the containers 10 are ejected from the posts 82 by use of a puff of compressed air which is passed through a center passageway 192 of the respective post 82 and through a channel 194 to cause the containers 10 to be pushed off of the posts 82 and into a gripper 196 of the machine 66. The gripper 196 transfers the containers 10 to a chute 198 where they are transferred to a packaging operation.

Although the present disclosure describes a process for molding a terminator 18 onto a cylindrical member 16, it should be understood that the member 16 may take various cross-sectional shapes such that a terminator could be applied to an extruded member of any shape. For example, a non-exhaustive list of various tubular shapes include shapes with triangular, pentagonal, hexagonal, or regular shapes. Still further, the cross-section of the tubular member is not limited to regular cross-sectional shapes and may be applied to any tubular member (e.g. an elongate member with a passageway there-through) that may have an injection mold configured to engage the shape and apply a terminator, such as terminator 18.

Although this disclosure refers to specific embodiments, it will be understood by those skilled in the art that various changes in form and detail may be made without departing from the subject matter set forth in the accompanying claims.

What is claimed is:

1. A method of forming a container from a tubular member, the method comprising the steps of:
    positioning the tubular member on a positioner of a support such that the positioner of the support locates the tubular member relative to a post of the support, the post configured to define a first side of a cavity for receiving a material injected into the cavity,
    moving a platen of an injection molding die to engage with the tubular member, the platen moving a portion of structure configured to define a second side of the cavity for receiving the material injected into the cavity, and defining one or more side walls of the cavity that are coincident with and parallel to the outer surface of the tubular member, and
    injecting a material into the cavity, the material forming a plug that engages an inner surface of the tubular member to form a hermetic seal therewith, the material further forming a cap for the tubular member which fills any space between a terminus of the tubular member and the cavity to form an extension of the walls of the tubular member such that the container has a length defined by a distance between the positioner and a terminal end of the cavity.

2. The method of claim 1, wherein the material is injected under pressure and in a plasticized state.

3. The method of claim 2, wherein the material is permitted to cool in the cavity to form the final shape of the container.

4. The method of claim 1, further comprising adjusting the location of the positioner along the length of the post to adjust for a variance in the length of tubular member.

5. The method of claim 1, wherein the support is positioned on a carrier that is movable relative to the platen and wherein the platen engages with a portion of the carrier as the platen is moved to engage with the tubular member, the engagement of the platen with the portion of the carrier causing the platen to be located relative to the support and tubular member.

6. The method of claim 5, wherein a plurality of supports are positioned on the carrier, each support including a positioner and a post supporting a respective tubular member and movement of the platen causes a respective cavity to be formed for each tubular member.

7. The method of claim 6, wherein each of the respective tubular members is simultaneously formed into a container as material is injected into each respective cavity.

8. The method of claim 7, further comprising adjusting the location of each respective positioner along the length of each respective post to adjust for a variance in the length of the respective tubular member.

9. A method of forming a container having a fixed length from tubular blanks having variable lengths comprising:
    locating a first end of a tubular blank relative to an injection molding die,
    inserting an open end of the tubular blank into the injection molding die,
    injection molding a plug in the interior of the tubular blank to form a bottom of the container while simultaneously forming a cap on the tubular blank to form an outer wall that is coincident with and parallel to the existing wall of the tubular blank to form the container with a pre-defined length that is independent of the length of the tubular blank.

10. The method of claim 9, wherein locating the first end of the tubular blank includes positioning the first end of the tubular blank against a positioner that supports the tubular blank relative to the injection molding die.

11. The method of claim 10, further comprising adjusting the location of the positioner to account for a different length of a tubular blanks.

12. The method of claim 11, wherein the positioner is adjustable relative to a post and the post defines a boundary of at least a portion of the plug that is formed in the injection molding die.

13. The method of claim 12, wherein a portion of the injection molding die moves relative to the post.

14. The method of claim 10, wherein the positioner is adjustable relative to a post and the post defines a boundary of at least a portion of the plug that is formed in the injection molding die.

15. The method of claim 14, wherein a portion of the injection molding die moves relative to the post.

16. The method of claim 1, wherein the tubular member has an end that extends past the post when the tubular member is positioned on the position of the support,
    wherein the plug that engages the inner surface of the tubular member comprises a disk with a top surface and a bottom surface, wherein the disk engages with the inner surface of the tubular member, wherein the disk does not extend past the end of the tubular member.

17. The method of claim 16, wherein the cap formed by injection of the material extends past the end of the tubular member, wherein the cap formed by injection of the material that extends past the end of the tubular member has a tubular shape.

18. The method of claim 1, further comprising:
    positioning a second tubular member on the positioner of the support such that the positioner of the support locates the tubular member relative to a second post of the support, the second post configured to define a first side of a second cavity for receiving a material injected into the second cavity, wherein the second post has a different length than the post,
    moving the platen to engage with the second tubular member, the platen moving a portion of structure configured to define a second side of the second cavity for receiving the material injected into the second cavity, and defining one or more side walls of the second cavity that are coincident with the outer surface of the second tubular member, and
    injecting a material into the second cavity, the material forming a second plug that engages an inner surface of the second tubular member to form a hermetic seal therewith, the material further forming a cap for the second tubular member which fills any space between a terminus of the second tubular member and the second cavity to form an extension of the walls of the second tubular member such that a second container formed by the second tubular member, the second plug, and the second cap has a length defined by a distance between the positioner and a terminal end of the second cavity, wherein the tubular member has the same length as the second tubular member, wherein the second container has a length different from the container.

19. The method of claim 9, wherein the plug that forms the bottom of the container comprises a disk with a top surface and a bottom surface, wherein the top surface of the disk forms the bottom of the container, wherein the disk does not extend past the open end of the tubular blank.

20. The method of claim 19, wherein the cap formed by injection molding extends past the open end of the tubular blank, wherein the cap formed by injection molding that extends past the open end of the tubular blank has a tubular shape.

\* \* \* \* \*